United States Patent [19]

Fisher

[11] Patent Number: 4,718,248
[45] Date of Patent: Jan. 12, 1988

[54] FOUR ELEMENT REFRIGERATION HEAT PUMP AND GEOTHERMAL CONTROL SYSTEMS

[76] Inventor: Stephen Fisher, 2350 SE. Floresta Dr., Port St. Lucie, Fla. 33452

[21] Appl. No.: 859,795

[22] Filed: May 5, 1986

[51] Int. Cl.[4] ............................................. F25B 27/00
[52] U.S. Cl. .................................. 62/238.7; 62/238.6
[58] Field of Search ................. 62/238.6, 238.7, 324.6, 62/324.7

[56] References Cited

U.S. PATENT DOCUMENTS

| | | | |
|---|---|---|---|
| 4,012,920 | 3/1977 | Kirschbaum | 62/238.7 X |
| 4,375,831 | 3/1983 | Downing, Jr. | 62/238.7 X |
| 4,399,664 | 8/1983 | Derosier | 62/238.7 |
| 4,420,947 | 12/1983 | Yoshino | 62/238.6 X |

Primary Examiner—Lloyd L. King
Attorney, Agent, or Firm—Malin, Haley & McHale

[57] ABSTRACT

A heating and cooling system with a single compressor and first and second compressor reversing valves for connecting a refrigerant fluid to more than one heat exchanger in a system. Said second compressor reversing valve permits the compressor to function as the primary compressor for different operating modes. A reversible heat pump means is operably connected to a plurality of heat exchange devices in indirect heat exchange with external thermal storage media common to the home such as room airspace, domestic hot water and pool or spa. Combinations of heating and cooling of the various external thermal storage media are realized by arranging valving and conduit means using appropriate control and switching apparatus.

14 Claims, 5 Drawing Figures

FOUR ELEMENT REFRIGERATION HEAT PUMP AND GEOTHERMAL CONTROL SYSTEMS

BACKGROUND OF THE INVENTION

1. FIELD OF THE INVENTION

The invention pertains to the art of refrigeration and heating systems utilizing a single reversible water source heat pump system for air conditioning, producing domestic hot water, and for utilizing waste heat resulting from air conditioning as a source of heat for heating swimming pools, spas, or similar thermal storage units. The invention also provides for the management of waste ground water, normally disposed of. The invention will also provide the cooling of a swimming pool/spa using ground water as a heat sink while simultaneously using the same water source as a heat sink in the process of space air conditioning. The invention further provides heating of swimming pools/spas, with a single heat pump system, without affecting the space normally heated or cooled using ground water as a heat source along with heat obtained from the compression action of the heat pump compressor.

2. Description of the Prior Art

Of the prior art patents retrieved as a result of a preliminary art search of the domestic U.S. patents, the following U.S. Pat. No. 4,012,920 is of interest on the basis of its teaching of a reversible heat pump and different heating and cooling modes.

Disclosed in a "Florida Heat Pump Brochure" dated Sept. 1, 1977 is a "Refrigeration Cycle and Heat Transfer" system including a condenser water supply and condenser water return conduits, and air passage means, a reversible heat pump including a compressor, two evaporator condenser coils, a discharge reversing valve, and a capillary tube for expansion of the working fluid.

U.S. Pat. No. 4,375,831 discloses a heating and cooling system which interposes a massive thermal storage unit between the earth and an indoor living space. The present invention eliminates the need for the interposition of a massive body while at the same time allowing the extraction of thermal energy from the earth. This advantage is especially important where space is a limited resource.

SUMMARY OF THE INVENTION

In accordance with the invention, the disclosed heating and cooling system is an improvement of the heating and cooling system disclosed in the "Florida Heat Pump Brochure", above discussed.

The prior art heating and cooling systems are improved by including (1) a second ported automatic directional valve or other equivalently unique valving means in the compressor suction line of the refrigerant fluid conduit means, hereinafter referred to as a suction reversing valve, or second refrigerant fluid reversing valve, (2) three liquid refrigerant valves, which may be solenoid operated, for defining condiuit paths or refrigerant fluid conduit means, (3) one heat exchanger flash evaporator, and (4) three heat exchange coils and valve means in the refrigerant fluid conduit means for diverting the refrigerant fluid to underga indirect thermal energy exchange with various mediums external to the reversible heat pump system. In addition, refrigerant fluid conduit means connect said components as will be described more fully below, including a first ported automatic directional valve, hereinafter referred to as discharge reversing valve, or first refrigerant fluid reversing valve, used in conjunction with a second reversing valve means, hereinafter a suction reversing valve, or second refrigerant fluid reversing valve, said suction reversing valve and said valve means in the refrigerant fluid conduit means for defining conduit paths for each of three respective base modes. Said suction reversing valve enables the compressor to receive efficient fluid from more than one heat exchanger, not heretobefore possible with a single compressor discharge reversing valve as disclosed in the prior art. This permits the compressor to function as the primary compressor for different operating modes, eliminating the cost of duplicative components. In general, the invention can be operated in any one of three base modes. A variety of valves, conduits for conveying refrigerant fluid, heat exchange devices, and a heat pump compressor are selectively communicable so as to achieve the desired heat transfer results. There are herein disclosed three primary configurations, called base modes one (I), two (II) or (III), respectively, each defined by a particular setting of said first and second refrigerant fluid reversing valves. There are also disclosed herein variations on each of the base modes, referred to simply as "modes", in which the communication between the compressor and various heat exchange devices is varied, yet the setting of said first and second reversing valves is held constant. Base mode one corresponds to mode one, base mode two corresponds with mode eight, and base mode three corresponds to mode eleven.

The reversible heat pump system is in indirect thermal energy exchange via the above mentioned heat exchange coils with various fluid mediums common to many homes, such as domestic hot water supply, circulating filterable swimming pool, spa, or other thermal storage fluid, indoor air space, and a well water irrigation system.

Each base mode may be varied upon to employ modes depending upon temperature conditions of the external media so that heat can be exchanged in any combination between the heat pump system heat exchange coils and the external fluid media, depending upon selection of flow conduits and valve means.

Of these base modes, which operate exclusively of each other, base mode 1 uses compressed refrigerant fluid in indirect heat exchange with an external supply of water, thus providing domestic hot water. The still heated refrigerant fluid is then condensed, giving off heat in indirect heat exchange in the process to circulating pool or spa water. The energy given off in this stage is merely discarded in other devices, as described in the prior art. The condensed refrigerant fluid is next expanded, and thereby absorbs heat to be used in cooling an airspace. The refrigerant fluid then flows via appropriate conduit and valve means to the compressor, completing the cycle. Modes 1 through 7 operate with heat pump system in base mode 1.

The second mode provides the heating of domestic hot water, cooling of indoor airspace, heat for circulating pool water, and irrigation using ground well water.

The third mode provides the same functions as the first mode above when airspace cooling is desired, and when air space cooling is not desired, the system merely provides irrigation well water.

The fourth mode provides for cooling of the airspace, cooling of the pool water, heating domestic hot water, and the supply of irrigation well water.

Mode 5 allows as mode 4 except that the well water for irrigation is disposed of into a dry well.

Mode 6 allows heated well water to mix with pool water for pool heating and filling, as well as cooling of airspace and heating domestic hot water.

Mode 7 provides for continuous pool filling when intermitent space cooling is in the idle status. In mode 7 ground water will be filtered and admitted directly to the pool/spa.

Base mode 2, or mode 8, uses compressed refrigerant fluid to heat domestic hot water supply, to heat airspace and to provide irrigation well water. In this base mode 2 the refrigeration cycle of base mode 1 is reversed by using discharge reversing valve and conduit means.

Mode 9 provides intermittent airspace heating and continuous well water irrigation. When heating airspace, irrigation water is cooled by heat exchange in heat pump system. When heat pump is inactive, irrigation override is provided wherein irrigation takes place via separate conduit and valve means.

Mode 10 is that of mode 8 except that ground water flows to dry well.

Base mode 3, or mode 11, provides domestic hot water, pool heat, and irrigation. The airspace heat exchanger and air mover is overridden in this mode so that the heat pump can transfer energy from ground water to pool.

Mode 12 provides pool heat, domestic hot water, and well water as a warming medium for evaporation heat exchanger of heat pump system as in mode 11 where well water discharge from flash evaporator is directed to dry well, not to irrigation.

Mode 13 provides pool heat on a timed basis, allowing the pool to be heated during certain pre-set times only.

Mode 14 provides for pool heat supply to be terminated upon pool water temperature reaching a certain predetermined upper value, and for re-supply of heated pool water upon establishment of a predetermined lower value.

DETAILED DESCRIPTION OF THE INVENTION

REFRIGERATION AND AIR HANDLING UNIT

Figure 1:
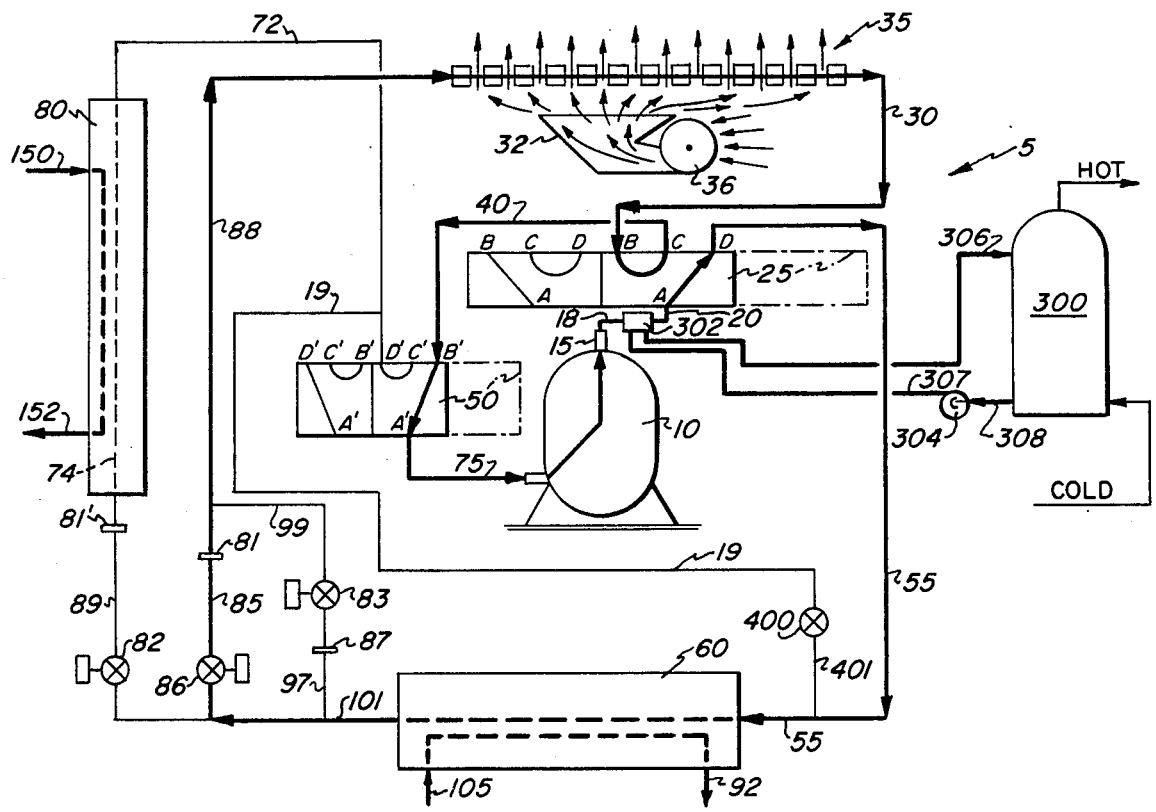
FIG. 1 is a sketch of the heat pump refrigeration cycle in base mode I.

Referring to the Figures, FIG. 1 shows the Refrigeration and Air Handling Unit, is generally designated by the numeral 5 and includes a compressor 10, the outlet port 15 communicating via conduit 18 with a domestic water heat recovery unit 302 which communicates via conduit 20 with port A of a compressor discharge reversing valve 25 including ports B, C and D, and in base mode 1, port C communicating via conduit 40 with port B' of a second reversing valve 50, hereinafter discussed, and port B communicating via conduit 30 with condenser-evaporator heat exchanger 35.

Second reversing valve 50 or compressor suction reversing valve also includes A' C' and D', port A' communicating via conduit 75 with the intake of compressor 10, and port B' communicating via conduit 40 with port C of discharge reversing valve 25, ports B and C of discharge reversing valve 25 in communication with each other.

The inlet of condenser-evaporator 60 communicates via conduit 55 with port D of discharge reversing valve 25 while the outlet of said condenser-evaporator 60 communicates via conduit 101 with first, second and third normally closed refrigerant solenoid valves 82, 86 and 87, however in this base mode 1 refrigerant solenoid valve 86 is opened. Also, conduit 55 communicates with fluid valve 400 via conduit 401. In base modes 1 and 3 valve 400 will be effectively closed to eliminate short cycling of discharge gas to compressor suction intake.

Condenser-evaporator 35 includes an inlet means communicating with refrigerant solenoid valve 86 via conduit 88 through refrigerant fluid expansion device 81 or any other device which functions as an expansion device, however a capillary tube is preferable in this invention. Outlet means of said condenser-evaporator 35 communicate with port B of discharge reversing valve 25 via conduit 30.

The suction reversing valve 50 enables the compressor 10 to receive the refrigerant fluid from more than one heat exchanger, not heretobefore possible with a single compressor discharge reversing valve as disclosed in the prior art. This permits the compressor 10 to function as the primary compressor for different operating modes.

Air blower unit 32 provides forced air for indirect heat exchange between cooler refrigerant fluid and warmer airspace and comprises air blower fan 36 and attached drive motor 36 with appropriate control means for activating said air blower unit.

Figure 2:
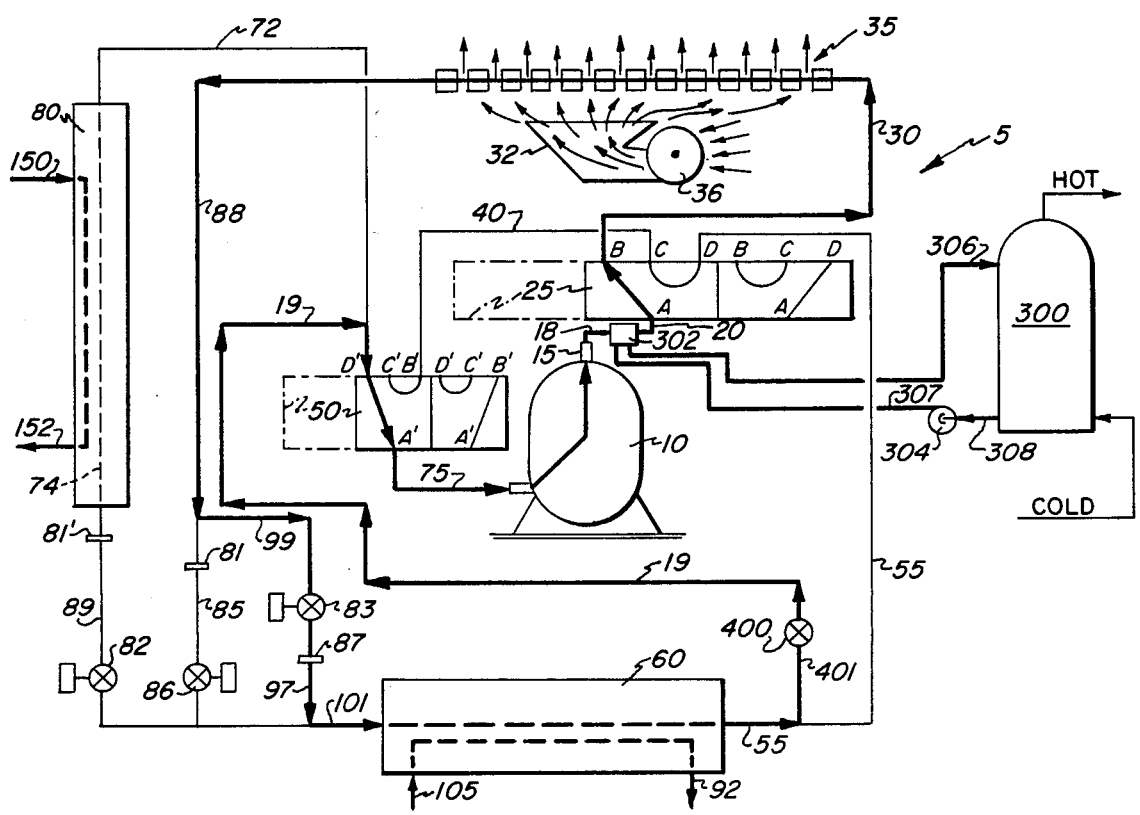
FIG. 2 is a sketch of the heat pump refrigeration cycle in base mode II.

In base mode 2, shown in FIG. 2, compressor outlet port 15 communicates via conduit 18 with domestic heat recovery unit 302 which communicates via conduit 20 with port A of discharge reversing valve 25, port B of said valve 25 communicating via conduit 30 to inlet means of condenser evaporator 35. In base mode 2, exchanger 35 functions as a condenser. The outlet of said unit 35 communicates with third refrigerant solenoid valve 83. Condenser-evaporator 60, functioning as an evaporator in this reversed system flow mode has an inlet means communicating via conduits 101 and 97 through expansion device 87, preferably a capillary tube, with refrigerant solenoid valve 83 open. Refrigerant solenoid valves 82 and 86 are closed in this base mode 2. Outlet means of said condenser-evaporator 60 communicating via conduits 55 and 401 through opened valve 400 to suction inlet port D' of suction reversing valve 50 via conduit 19 and outlet port A' of suction reversing valve 50 communicating via conduit 75 with suction inlet of compressor 10.

In the third and final base mode 3, refrigerant fluid path 18, 20 and 55 from compressor outlet port 15 to heat exchanger 60 inlet is the same as base mode one, including the effective closure of valve 400.

Condenser-evaporator 60 functions in this base mode 3 as a condenser and communicates at its inlet means with port D of discharge reversing valve 25 via conduit 55, the outlet means of said heat exchange unit 60 communicating with flash evaporator 80 via conduit 101 through first refrigerant solenoid valve 82 and via conduit 89 through expansion device 81', preferably a capillary tube, to flash evaporator conduit 74. In this base mode 3 second and third refrigerant solenoid valves 86 and 87 are closed.

Suction reversing valve 50 includes suction inlet port D' in communication via conduit 72 with flash evaporator conduit 74. Port A' communicates via conduit 75 with suction inlet of compresser 10. Ports D' and A' communicate with each other.

It should be noted that this base mode 3 embodies an airspace heat exchange override means not heretofore possible with a single compressor discharge reversing valve as disclosed in the prior art. Thus a single heat pump system providing a function other than the cooling or heating of the air space as disclosed in prior art.

REFRIGERATION AND AIR HANDLING UNIT ADJUNCTS

Figure 4:
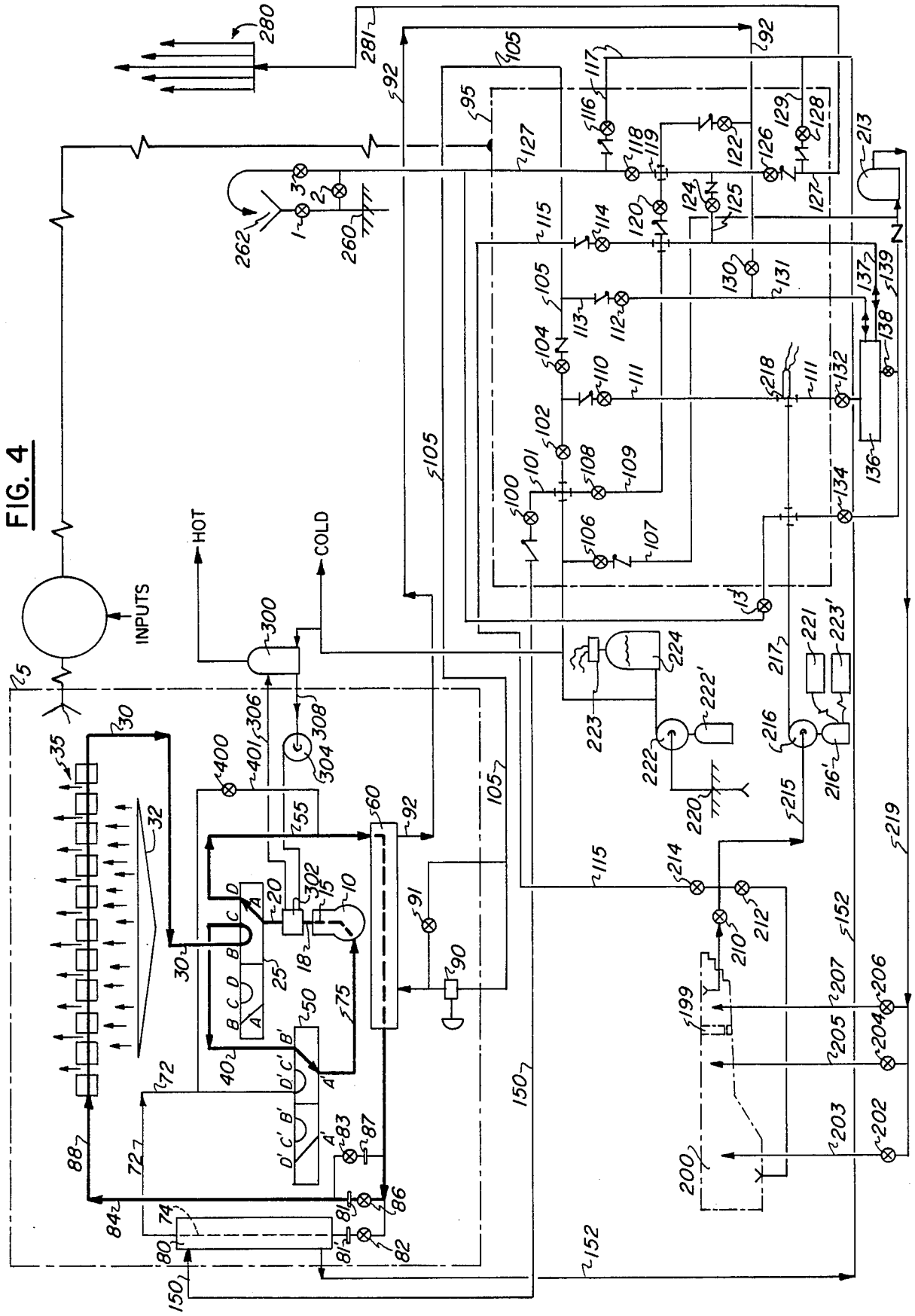
FIG. 4 is a schematic of the entire conduit system together with the heat pump refrigeration cycle and various heat exchange units.

Referring now to FIG. 4, the control box 95 includes various valves and interconnecting conduits 92–131, hereinafter discussed in conjunction with swimming pool/spa 200 and interconnecting valves and conduits 202–207, 219, 210, 212, 214, 115, 152, 217, pool pump 216, pool filter 213 ground well 220, ground well pump 222, dry well 260, irrigation means 280, domestic hot water recovery unit 302, domestic hot water storage 300, and hydropneumatic accumulator 224 and pressure switch 223. pressure switch 223 activates motor 222', driving pump 222. Pool pump motor 216' being electrically connected to contactor 221 and timer 223; or contactor 221 alone. Contactor 221 will energize motor 216' when compressor 10 is energized during base mode 1 and base mode 3. Timer 223' will also energize motor 216' during periods when filtering of pool water is necessary and operation of heat pump system is idle for long durations, this being determined by climatic conditions. The use of timer circuit being similar to what normally is now used to start and stop the pool circulating pump. Thus the circulation of pool water may be independent of the central heat pump system, for instance when building is vacated for long periods and pool/spa filtration is still necessary.

The details of the refrigeration and air handling unit are hereinafter discused in conjunction with some of the modes of use of the overall system.

MODE I: refer FIGS. 1 and 4

A—Produce Domestic Hot Water
B—Heat Pool
C—Filter Pool
D—Cool Space

USING WASTE HEAT BY-PRODUCT OF A/C MODE

Mode I is one and the same as base mode 1 wherein compressor 10 is activated by a contactor via thermostat switch closure in space being cooled and compressor discharge reversing valve 25 is positioned to open port A to port D and port B to port C and at the same time compressor suction reversing valve 50 is positioned to open port B' to port A' and port D' to port C'. Simultaneously blower fan 32 is activated to draw air from a building and circulate it across evaporator-condenser coil 35, as seen in FIG. 1. Dduring mode 1, coil 35 functions as an evaporator.

Conduit path for fluid via conduit 401 and through valve 400 is secured with valve 400 being closed.

Hot refrigerant fluid from compressor 10 flows via conduit 55 to heat exchanger 60 where it is condensed to a liquid. Solenoid valve 86 is effectively opened creating a flow of liquid refrigerant from heat exchanger 60 to expansion device 81 thereby resulting in flashing of the liquid refrigerant to the gaseous state while passing through evaporator/condenser 35, thus cooling air flow to airspace. Heat from space being cooled is rejected to cooling medium contained in heat exchanger 60 through heat absorption in 35 and transmission of that heat along with the heat of compression to heat exchanger 60. The gas after absorbing heat in heat exchanger 35 returns to reversing valve 25 at port B, flows through and exits via port C to port B' of reversing valve 50 and exits therefrom via port A' communicating with suction side of compressor 10 via conduit 75. During times of no refrigerant flow, i.e. reversing valves de-energize, the pressures in the reversing valves 25 and 50 between each port are equalized or substantially equalized to minimize the frictional resistance of the shuttle valve in the reversing valve housing. Domestic hot water circulation pump 304 will be activated and is connected to a heat exchanger 302 with domestic hot water in indirect heat exchange with superheated discharge fluid from compressor 10. As seen in FIG. 4, the pool pump 216 is energized by a suitable contactor 221. Water valve 110 is opened and at the same time a temperature sensor 218 may monitor the pool temperature and compare it to a "Set Point" of a master control, depending on degree of automation. Water flows from the discharge of pool/spa (Thermal Storage Unit) pump 216 via conduit 217 and 211 through valve 110 and valve 132, creating two flow circuits. After flowing through valve 110 water flows then to valve 104 and conduit 105 through a flow regulating valve 90 which modulates the quantity of flow of coolant water for establishing a highly efficient compressor discharge pressure, or additional water may also flow through bypass valve 91 simultaneously. The heat transfer relationships embodied in the system are independent of the varying degrees of automatic control, valve types and piping configurations. This upper circuit of the massive thermal storage unit (i.e. pool or spa) water then enters condenser evaporator 60 in indirect heat exchange with the hot refrigerant fluid thereby heating the water which then exits via conduit 92 returning to the control box 95 flowing through valve 130 to conduit 131 to heat exchanger 136 and then exits the heat exchanger via line 137 to open valve 114 flowing back via conduit 115 to the suction inlet of pool pump 216 via valve 214. Heat exchanger 136 may be eliminated should certain modes of operation not be desired, wherein water 121 would thus return to storage tank (i.e. pool or spa). During this mode, the secondary flow circuit to valve 132 provides, through indirect heat exchange, a heat sink to absorb heat removed from the space being cooled which is returned to heat exchanger 136 through conduit 131 as previously described. Thus, both sides of heat exchanger 136 contain pool/spa water in indirect heat exchange with each other during this mode.

A valve 132 is positioned in conduit 111 which can be of the manual type including indexing means which can be adjusted (i.e.: "closed off slightly") as the pool temperature rises. Adjusting valve 132 compensates for pipe friction and thereby ensures adequate flow of pool/spa water to valve 110, valve 104, and condenser evaporator 60. Initial adjustment may void need of further adjustment. During this mode, base mode 1, the pool/spa "massive thermal storage unit" will be intermittently heated with waste heat from the space being cooled during periods when the procedure for airspace cooling is initiated via thermostat action.

Additional flow adjustments can be effected with valves 210, 212, 214, 202, 204 and 206, if desirable. With use of storage divider 199 it is possible to heat only a small section of thermal storage unit i.e. pool spa. In this operation, 202 and 204 would be closed and only 206 open. Likewise 212 would be shut and only 214 and 210 open.

During this mode all cooling water for condenser 60 is supplied from "massive thermal storage unit" (pool/spa) via pump 216. During this mode since it is a "closed loop" there is no irrigation/waste water to deal with. It should be noted that pool pump 216 is effectively creating filtering flow and simultaneously providing cooling water flow for heat pump. Previously this cooling flow necessitated operation of a separate pump.

A—AIR CONDITIONS SPACE
B—HEAT POOL; REUSE WASTE HEAT FROM SPACE
C—FILTER POOL
D—PRODUCE HOT DOMESTIC WATER
E—SUPPLY IRRIGATION WATER FROM GROUND WATER SUPPLY

During Mode II the refrigeration process flow of liquid and gas is the same as Mode I. In Mode II the pump 216 will be activated by thermostat relay in space being cooled, yet will not supply cooling water for heat exchanger 60.

Thermostat in space being cooled will activate the refrigeration cycle of FIG. 1 as stated in Mode I. During Mode II through suitable water valve switching in a fully automatic system, or through the manual presetting of water valves in "geothermal control box" 95 of FIG. 4 in a semi-manual system, the following will exist or be established. Note: valves 102 and 104 must be of the solenoid type and opened when compressor 10 is activated and closed when compressor 10 is deenergized to control the flow of ground water or well from accumulator 224 and ground water pump 222, since pump motor 222' is activated solely via pressure switch 223. Actuation of valves 102 and 104 may be accomplished through a thermostat actuated relay.

Water valves 102 and 104 will be open and water from well pump 222 and hydro-pneumatic tank will pass through conduit 105 to flow regulating valve 90 supplying cooling water for condenser/evaporator 60. Ground water will obtain heat through indirect heat exchange with the hot and condensing gases in heat exchanger 60. After gaining heat the cooling water will exit heat exchanger 60 via conduit 92 and return to control box 95. In control box 95 valve 130 will be open/opened allowing relatively warm water to be admitted through conduit 131 to heat exchanger 136. This relatively warm water will be in indirect heat exchange with cooler pool water being pumped through the pumping action of pump 216. Pump 216 will supply cooler water to heat exchanger 136 through conduit 111 and normally open (N.O.) valve 132. After gaining heat this heated pool water will exit heat exchanger 136 via normally open (N.O.) manual valve 138 and flow to filter 213 via conduit 139. From filter 213 it will return to storage unit pool/spa through conduit 219 and a combination of selected valves and conduits 202 through 207.

Ground well water will give up its heat in heat exchanger 136 which had been gained in heat exchanger 60. This is to say that the ground water is first heated in heat exchanger 60, then cooled in heat exchanger 136. It will be cooled to approximately near the temperature of the water being supplied to heat exchanger 136 via conduit 111 through the pumping action of pump 216.

Figure 5:
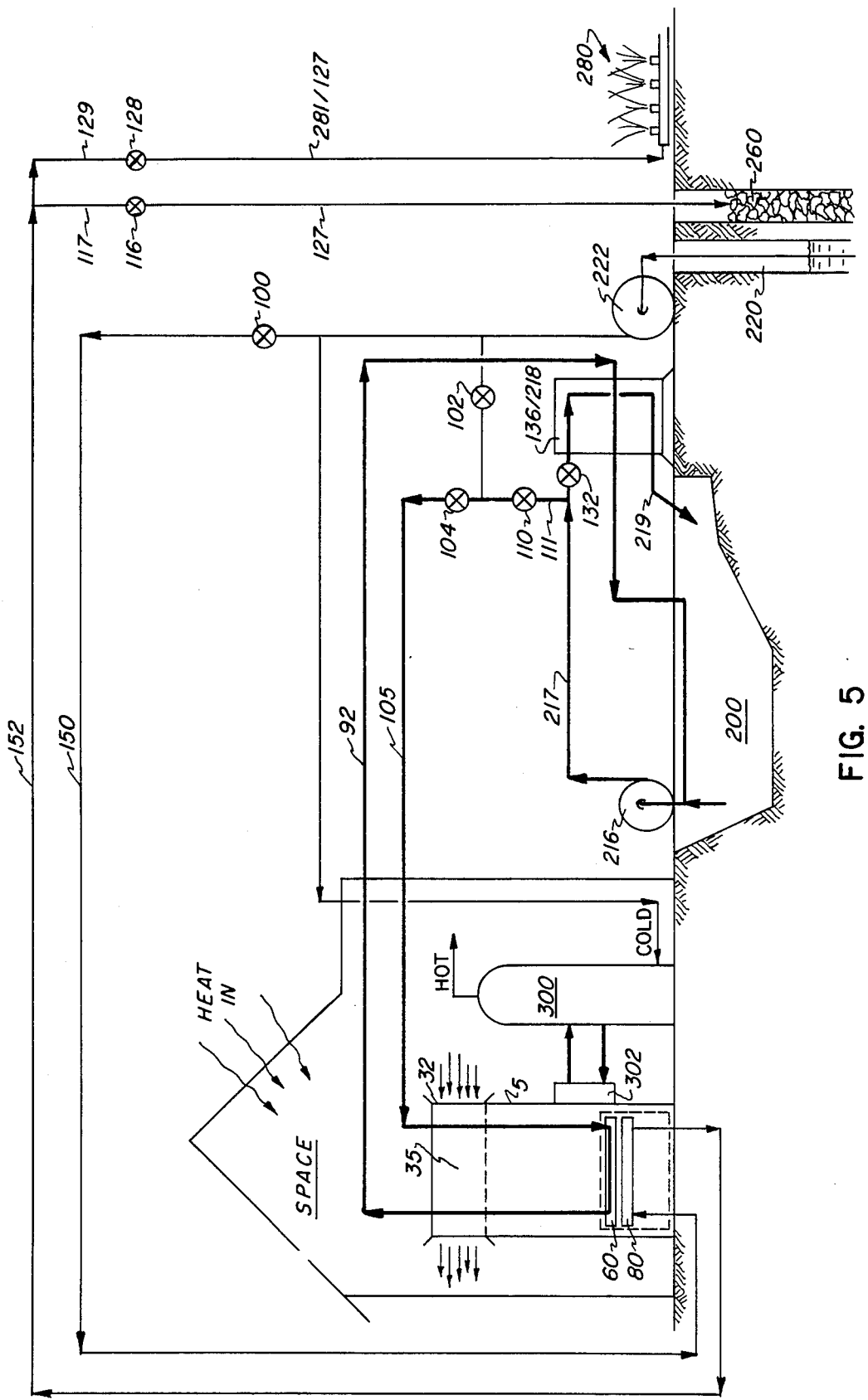
FIG. 5 is a sketch of one embodiment of the conduit system external to the heat pump refrigeration cycle.

Ground well water after being cooled will exit heat exchanger 136 via conduit 137 and will flow to open/opened valve 124. From this point on, this ground water may be directed to either irrigation zones 280, through valve 126 or to waste funnel 262 or drywell 260 through valve 118. An embodiment of external fluid flow conduits in relation to refrigeration and air handling unit 5 is shown in FIG. 5.

Mode III

Mode 3 would be selected when continuous irrigation is called for. When mode 3 is selected irrigation will be provided as stated in mode 2 when air space cooling is initiated through thermostatic control. When in mode 3 and air space cooling signal is interupted via opening of said thermostatic switch, the refrigeration process and valving described in mode 2 will be interupted, and referring to FIG. 4, ground water will be supplied to irrigation manifold 280 through conduit 281, valves 126 and 124, conduits 125 and 109 and valve 108. Utilization of mode would require automatic valves and control means.

MODE IV

A—COOL BUILDING
B—COOL POOL
C—FILTER POOL
D—IRRIGATE

Referring now to FIGS. 1 and 4, reversing valve 25 will be ported A to D and C to B. Reversing valve 50 ported B' to A' and D' to C'. The refrigeration cycle being the same as base mode I. During this mode, as seen in FIG. 4, valve 108 will be opened/open and relatively cool ground water from ground well 220 flows via conduits 109 and 137 into heat exchanger 136. With the operation of pool pump 216 upon activation of air conditioning via thermostat, pool water will transfer its heat, in heat exchanger 136, to the relatively cooler ground water. The filtered and cooled pool water will return to the pool via conduit 219. The slightly heated ground water will flow through conduit 131, valve 112, conduit 113 and conduit 105 to condensor/evaporator 60 with flow being regulated by flow regulating valve 90. This relatively high pressure water exits condensor 60 after receiving heat and return to the control box 95 via conduit 92. Valves 122 and 126 are opened/open permitting water to flow through and out of the control box and thereby supply high pressure, slightly heated water flow to irrigation distribution manifold 280. Note: in mode 4 as explained above; valve 108 must be of the solenoid actuated to enable to cut-off flow of pressurized ground water when compressor is deenergized. This eliminating the continuous flow of ground water.

MODE V

Mode 5 is the same as mode IV except should irrigation water not be required, then ground water will flow into a drywell 260 or waste funnel 262. In this instance valve 118 will be open/opened and valve 126 will be closed. These valves can be preset.

Mode VI

A—COOL SPACE
B—FILTER POOL WATER
C—PRODUCE DOMESTIC HOT WATER
D—IRRIGATE
E—HEAT AND FILTER POOL REFILL WATER

The compressor 10, and other refrigeration components including domestic hot water recovery are energized as in Mode I, FIG. 1. From FIG. 4, valves 102 and 104 are open and well pump 222 activates when switch 223 closes on reduction of pressure resulting from addition of water to the pool, as follows. Flow regulating valve 90 will regulate the supply of ground water to condenser 60 and this cooling water will return to the control box via conduit 92 where valves 122, 120 and 114 will be open/opened. From valve 114 the water will enter the pool system along with other water being suctioned from pool/spa via valves 210, 212. This combination of suctions, obtained through valves 214, 210, and 212 are pumped through heat exchanger 136, out via 138 and to and through pool filter 213 via conduit 139, back to pool 200 via conduit 219 and valves 202, 204 and 206. During this mode heat is rejected from space being cooled to the refill water which is added to the pool/spa to reestablish normal level. This heated and filtered refill water is added intermittently when compressor is activated to cool the space, thus continuous monitoring of level rise is unnecessary.

Mode VII

A.—CONTINUOUS POOL FILLING WITH FILTERED WATER.

In mode 7 ground water will flow from accumulator 224 to valve 106, through conduit 107 to and through filter 218. Conduit 219 will provide conduit means to valves 202, 204 and 206 and conduits 203, 205 and 207 thus providing continuous flow of filtered ground water to pool/spa.

Mode VIII

A—HEAT BUILDING
B—SUPPLY IRRIGATION WATER
C—PRODUCE HOT DOMESTIC WATER

During this base mode 2, or mode 8, the space previously being air conditioned will now be heated, still with the use of only one heat pump, as in FIG. 2.

On closure of thermostat in space being heated, with controls set to demand "space heating", compressor 10 and fan 36 will be energized. Hot gas from compressor 10 will be directed through valve 25 to exit at port B. From port B, the hot gas will flow through conduit 30 to condenser/evaporator 35. In this instance 35 will be acting as a condenser. In condenser 35 the hot gas will give up its latent and some sensible heat to convective air flow to space being heated through indirect heat exchange in heat exchanger 35. Blower fan 36 will supply the needed air for this exchange of heat. Relatively cool air will thus be heated and returned to space being heated.

As seen in FIG. 2, liquid refrigerant will exit condenser 35 via conduit 88 and flow to refrigeration solenoid valve 83 which will be opened. Refrigerant solenoid valves 82 and 86 are closed in this base mode 2, as previously set forth. Liquid refrigerant will be expanded to a lower pressure through expansion device 87. This liquid refrigerant will enter evaporator/condenser 60, at the left, and gain heat from liquid being supplied via well pump 222, open/opened valves 102, 104, conduit 105, and open/opened valve 91, depicted in FIG. 4.

Superheated gas will exit evaporator 60 and flow through conduit 55 and 19 and opened valve 400 to port D' of valve 50. Port D' will be set to communicate with port A' of valve 50. Hot gas will exit valve 50 through port A'. This gas will flow through conduit 75 to compressor suction inlet.

During this operation space heat will be effectively extracted from ground water with the operation of the refrigeration heat pump.

Conduit 92 provides flow of cooled ground water back to geothermal control box 95 and through opened valves 122 and 126, this cooled water is directed to irrigation distribution device 280 through conduit 281.

During this mode pool/spa water is unaffected and pool pump, and flow of pool water, may be idle, or may operate simultaneously for freeze protection to pool equipment. Even though they are operating simultaneously there is no thermodynamic interaction between the pool/spa, ground water, or space.

Mode IX

A—IRRIGATION FROM GROUND WELL

During this operation the system enables for the irrigation without encompassing any of the other system functions i.e. heating/cooling. During Mode IX, well pump 222 will be energized on a decreasing pressure and pressure switch 223 will be closed.

Valves 108, 124, and 126 will be effectively opened providing the "short-circuit" flow of ground water through control box 95 to zone 280 for purposes of irrigation through conduits 127 and 281.

Mode X

A—HEAT HOME INTERMITTENTLY
B—WELL WATER CIRCUITED TO
DRY WELL WHEN HEAT PUMP IS ON
C—DOMESTIC HOT WATER INTERMITTENT

This mode provides airspace heat according to the embodiment of Base Mode 2 or Mode VIII, shown in FIG. 2, intermittently. Cooled well water from evaporator 60 is directed to dry well 260 via conduits 92 and 127 using valves 122 and 118 in the open position. The function of this mode being the same as mode 8 yet excess cooled ground water being directed to drywell 260 rather than irrigation zone 280 as done during mode 8, a base mode.

Mode XI

A—HEAT POOL USING GROUND WATER AS HEAT SOURCE
B—FILTER POOL WATER
C—IRRIGATE
D—PRODUCE DOMESTIC HOT WATER

This mode will be fully described below as base mode 3.

Figure 3:
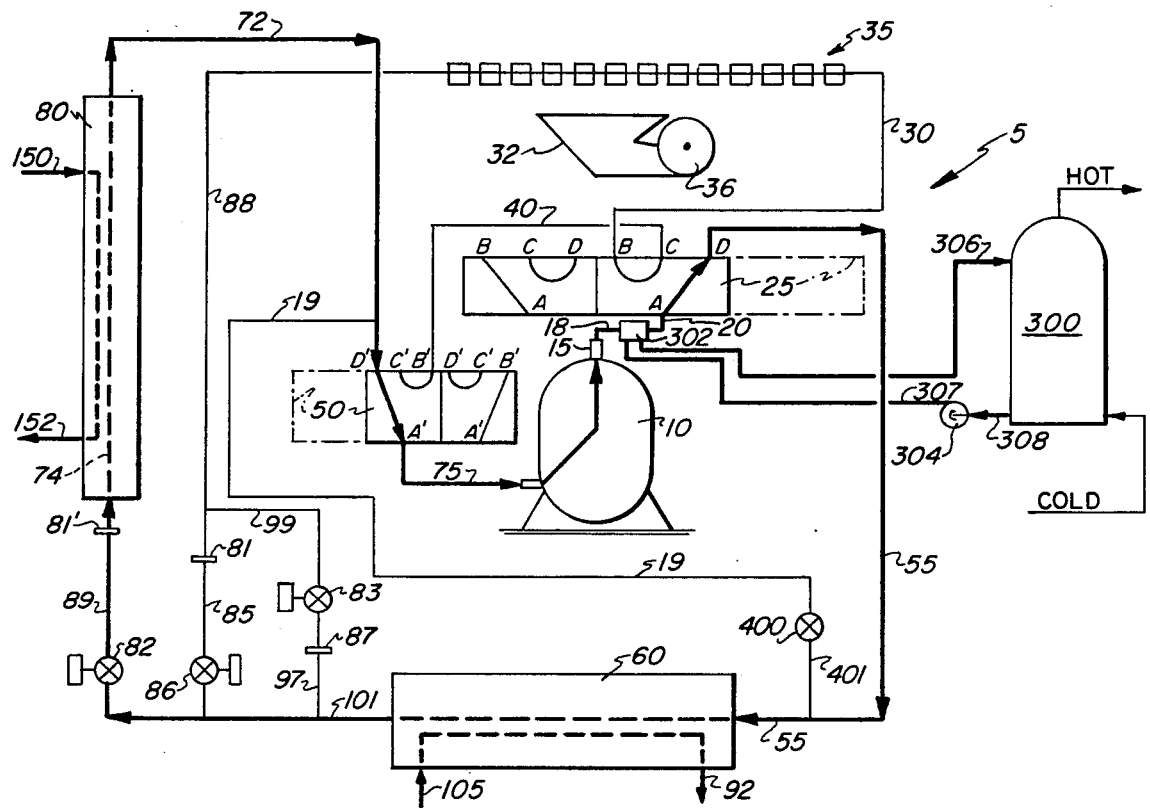
FIG. 3 is a sketch of the heat pump refrigeration cycle in base mode III.

The refrigeration and air handling unit of FIG. 3 shows condenser/evaporator 60 in indirect heat exchange with pool water circulation conduits 92 and 105. Heat as a result of compression from compressor 10 is absorbed by pool water in heat exchanger 60, and thereafter transmitted to the pool. The high temperature refrigeration gas is thus condensed to a liquid via indirect heat exchanger with pool water in heat exchanger 60. Heat exchanger 60 during this mode is functioning as a condenser.

The compressor is activated through suitable controls. Reversing valve 25 will be ported A to D and hot gas will be admitted to condenser 60 via conduit 55. Valve 400 will be effectively closed. Fan 36, heretobefore being energized on closure of thermostat will now be deactivated. Referring to FIG. 4, pool pump 216 is activated and water via conduit 105 flows through open valves 110, 104 and to flow regulating valve 90 through conduit 105. The pool water absorbs heat by indirect heat exchange with hot refrigeration gas in condenser 60.

The heated pool/spa water from condenser 60 return to control box 95 via conduit 92. This heated pool water flows to heat exchanger 136 via valve 130 and conduit 131. Through indirect heat exchange this heat is transmitted to other pool water circulating in heat exchanger 136 and returns to pool via valve 114, conduit 115 and valve 214. The heated pool water is filtered and returns to pool via valve 138, conduit 139, filter 213 and conduit 219 conduit 219.

The condensed refrigeration liquid exits condenser 60 and through valve 82 and expansion device 81' is expanded into a gas in "flash evaporator" 80 having water circulated therethrough from ground well 220 via well pump 222. To accomplish this flow of ground water to "flash evaporator" 80 flow will be controlled in control box 95.

Valve 100 will be activated permitting pressurized well water exit the control box flowing into the upper portion of the flash evaporator 80 via conduits 150.

The ground water discharges from the bottom of the flash evaporator, somewhat cooled and returns to control box 95 via conduit 152 through open/opened valve 128 via conduit 129 then via conduit 127 to irrigation zones 280, or to waste funnel 262 or drywell 260 via conduit 117, valve 116 and conduit 127.

Domestic hot water heat exchanger 302 indirectly transfers heat energy from compressed refrigerant fluid to a supply of water used as domestic hot water stored in domestic hot water storage vessel 300, as more fully set out in mode 1. Flash evaporator 80 is in indirect heat exchange with irrigation well water acting as evaporator heat source via conduits 150 and 152 as in FIG. 3. The advantage of this mode is seen in the fact that heat from the ground water and compression heat is transferred indirectly via heat pump 5 to the pool or spa. As shown in FIG. 4, well 220 is in communication with evaporator 80 through interposed well water circulating pump 222 via conduit 101 and 160 and by means of close valves 106, 108 and 102 and open valve 100. Irrigation zone 280 connects to outlet means of said flash evaporator 80 via conduits 152 with valve 128 open.

A benefit resulting from the flash evaporator is that ground water is at a constant high temperature and the unit is not dependent on ambient air as required by air-water systems. This aspect of the invention results in greater efficiency in that the temperature of the ground water is constant or substantially constant. This being true even when ambient air temperatures are low, i.e. nights. Flash evaporator 80 alos allows for the refrigeration process to continue while not maintaining evaporator 35 in operation. In this manner, with blower fan 36 being deactivated, one may still warm swimming pool/spa without affecting interior space temperatures.

The operation of flash evaporator 80 will provide for a more continuous supply of irrigation water. Also, since the ground water temperature is essentially constant year round the refrigeration unit compressor may be sized smaller since it is enabled to run longer due to the fact that it is not affected by periods of low ambient air temperatures. This longer period of constant heat source, i.e. 24 hours per day, allows for longer run times and reduced component sizes.

Flash evaporator 80 also allows the same unit space air conditioning heat pump to accomplish three additional functions that normally would have to be accomplished by other separate appliances. These functions being (1) heating of domestic hot water, (2) irrigation, and (3) the heating of the thermal storage unit i.e. pool/spa.

Mode XII

The heating and cooling system embodiment of Mode XI, with the change that flash evaporator 80 has outlet means connected to dry well via conduits 152 and 117 through open valve 116. Valves 118 and 128 are closed in this mode.

Mode XIII

Pool Heat Override on Timer

A heating and cooling system as described in Modes XI and XII wherein a timer (not shown) is interposed within the pool water circulating sybsystem creating a pool heat override arrangement. Said timer can be set to allow pool heating via indirect heat exchange with heat pump 5 for whatever time periods per day desired.

Mode XIV

Pool Heat Override Upon Pool Water Reaching Predetermined Temperature

A heating and cooling system as described in Modes XI and XIII wherein pool water circulating subsystem and heat pump system, as described in mode 11, is disabled upon pool water temperature reaching a predetermined value. Temperature sensor 218 of FIG. 4 communicates pool water temperature sensor to pool water circulation and heat pump controls, along with associated valving control means.

What I claim is:

1. A building heating and cooling system for using waste heat to thermally energize thermal storage media to control the temperature of a relatively large pool of water, comprising:

conduit means for circulating the water in said pool;
   a heat pump having a single refrigerant fluid compressor with a suction inlet and a pressure discharge outlet;
   a refrigerant fluid for use in said compressor;
   a first fluid-to-fluid heat exchange means in fluid communication with said pressure discharge of said compressor;
   a first refrigerant fluid reversing valve means in fluid communication with said first fluid-to-fluid heat exchange means;
   a second fluid-to fluid heat exchange means in fluid communication with said first reversing valve means, said second fluid-to-fluid heat exchange means having a first input and output and a second input and output, said second heat exchange means for indirect heat exchange with the water in said pool or spa
   a fluid-to-air heat exchange means for indirect heat exchange between said refrigerant fluid in said fluid-to-air heat exchange means and an airspace, said fluid-to-air heat exchange means being fluidly connected to said first output of said second heat exchange means and directly to said first refrigerant fluid reversing valve means without passing through said second reversing valve means;

a second refrigerant fluid reversing valve means in fluid communication with said suction inlet of said refrigerant fluid compressor, said second refrigerant fluid reversing valve means for selectively diverting refrigerant fluid flow from heat exchange components within said system to said suction inlet of said compressor;

refrigerant fluid conduit means associated with each of said heat exchange means, said compressor, said first refrigerant fluid reversing valve means and said second refrigerant fluid reversing valve means;

valve means operably defining a refrigerant fluid conduit pathway together with said first and second reversing valve means for directing fluid flow direction through said refrigerant fluid conduit pathway wherein said second fluid to fluid heat exchange means operates as a condenser in indirect heat exchange with said conduit means for circulating pool water.

2. A building heating and cooling system for using waste heat to thermally energize thermal storage media to control the temperature of a reltively large pool of water, comprising:

conduit means for circulating water in said pool;

pool water pump means for circulating said pool water;

a heat pump having a single refrigerant fluid compressor having a suction inlet and pressure discharge outlet; a refrigerant fluid for use in said compressor;

a first fluid-to-fluid heat exchange means in fluid communication with said pressure discharge of said compressor;

a first refrigerant fluid reversing valve means in fluid communication with said first fluid-to-fluid heat exchange means;

a second fluid-to-fluid heat exchange means in fluid communication with said first refrigerant reversing valve means, said second fluid-to-fluid heat exchange means for indirect heat exchange with the water in said pool/spa;

a third fluid-to-fluid heat exchange means in fluid communication with said second heat exchange means;

a fluid-to-fluid heat exchange means for indirect heat exchange between said refrigerant fluid in said fluid-to-air heat exchange means and an airspace, said fluid-to-air heat exchange means fluidly connected to said first output of said second heat exchange means and to said first refrigerant fluid reversing valve means;

a second refrigerant fluid reversing valve means in fluid communication with the suction inlet of said refrigerant fluid compressor, said second refrigerant fluid reversing valve means for diverting refrigerant fluid flow from either said first refrigerant fluid reversing valve or said second fluid-to-fluid heat exchange means or said third fluid-to-fluid heat exchange means;

refrigerant fluid conduit means associated with each of said heat exchange means, said compressor, and said first refrigerant fluid reversing valve means and second refrigerant fluid reversing valve means;

valve means operably defining refrigerant fluid conduit paths in each of three exclusive heat pump base modes, said valve means selectively opened or closed for defining conduit pathways including in each of said three base modes said second heat exchange means;

a first refrigerant fluid expansion device connected in said refrigerant fluid conduit means between said second heat exchange means and said fluid-to-air heat exchange means;

a second refrigerant fluid expansion device connected in hydraulically parallel refrigerant fluid conduit means with respect to said first expansion device, said second expansion device interposed between said third heat exchange means and said second heat exchange means;

a third refrigerant fluid expansion device connected in hydraulically parallel refrigerant fluid conduit means with respect to said first and second expansion devices; said third expansion device connected to said fluid to air heat exchange means and to said second heat exchange means.

3. A building heating and cooling system as defined in claim 2, wherein:

said second refrigerant fluid reversing valve means is interposed in fluid communication between said first refrigerant fluid reversing valve means and said suction inlet of said compressor, while said heat pump is operating in the first base mode of said three base modes.

4. A building heating and cooling system as defined in claim 2, wherein:

said second refrigerant fluid reversing valve means is interposed in fluid communication between said second fluid-to-fluid heat exchange means and said suction inlet of said compressor, while said heat pump is operating in the second base mode of said three base modes.

5. A building heating and cooling system as defined in claim 2, wherein:

said second refrigerant fluid reversing valve means is interposed in fluid communication between said third fluid-to-fluid heat exchange means and said suction inlet of said compressor, causing said heat pump to operate in the third base mode of said three base modes.

6. A building heating and cooling system as defined in claim 1, wherein:

said first input of said second fluid-to-fluid heat exchange means is in fluid communication with said first reversing valve means;

said first output of said second fluid-to-fluid heat exchange means is, in fluid communication with said fluid-to-air heat exchange means, whereby said first refrigerant fluid expansion means is fluidly interposed between said first output of said second heat exchange means and said fluid-to-air heat exchange means.

7. A building heating and cooling system as defined in claim 6, wherein:

said second input is in fluid communication with said pool for receiving a flow of pool water from said conduit means for circulating pool water; and said second output means of said second fluid-to-fluid heat exchange means is in indirect thermal communication with said pool for discharging a heated flow of pool water through said second output means for indirect heat exchange with circulating pool water for warming the relatively massive quantity of water in said pool.

8. A system as defined in claim 6, comprising:

conduit means for circulating ground well water;

said third fluid-to-fluid heat exchange means having a first input and output and a second input and output, said third fluid-to-fluid heat exchange means for indirect heat exchange with circulating ground well water;

pumping means for circulating ground well water,

9. A system as defined in claim 8 wherein said third fluid-to-fluid heat exchange means is an evaporator.

10. A system as defined in claim 9, wherein:

said first output of said third fluid-to-fluid heat exchange means is in fluid communication with said second refrigerant fluid reversing valve means; and said first input of said third fluid-to-fluid heat exchange means is in fluid communication with said second refrigerant fluid expansion means; and said second input of said third fluid-to-fluid heat exchange means is in fluid communication with a ground well water source and a ground well water circulating pump means for causing ground well water to be brough into indirect heat exchange with said refrigerant fluid in said third fluid-to-fluid heat exchange means;

said second output of said third fluid-to-fluid heat exchange means is in fluid communication with either an irrigation pumping means for distributing said well water about an irrigation zone, or a dry well disposal means for disposing of said well water into the earth.

11. A system as defined in claim 10, wherein: said ground well water gives up a quantity of heat in indirect heat exchange with said refrigerant fluid;

said refrigerant fluid is heated and thereby raises the overall heat pump system temperature;

said heated refrigerant fluid exchanges said quantity of heat in indirect heat exchange with pool water circulating through said second fluid-to-fluid heat exchange means;

said pool water is heated and thereby undergoes a temperature increase; and said pool water is circulated by said pool water pump means through said pool water conduit means back into direct or indirect heat exchange with circulating pool water, thereby raising the overall temperature of the relatively large quantity of water in said pool.

12. A heating and cooling system as set forth in claim 7, including:

an airspace to be cooled;

an air passage means through which air to cool said airspace is passed; and said fluid-to-air heat exchanger means disposed in said air passage means.

13. A system as defined in claim 12, wherein: said airspace gives up a quantity of heat with said refrigerant fluid in said fluid-to-air heat exchange means;

said refrigerant fluid is heated and thereby raises the overall heat pump system temperature;

said heated refrigerant fluid exchanges said quantity of heat in indirect heat exchange with said pool water circulating within said second fluid to fluid heat exchange means;

said pool water is heated thereby undergoing a temperature increase; and said pool water is circulated by said pool water pump means through said pool water conduit means back into indirect or direct heat exchange with circulating pool water, thereby raising the overall temperature of the relatively large quantity of water in said pool.

14. A heating and cooling system as defined in claim 2, comprising:

a network of conduit and valve means for selecting conduit pathways and first and second reversing valve means for defining refrigerant fluid flow direction through said heat pump in each of said three base modes wherein said second and said fluid-to-air heat exchange means operate as either a condenser or evaporator depending upon refrigerant fluid flow direction.

* * * * *